United States Patent [19]

Howells et al.

[11] Patent Number: 5,457,800
[45] Date of Patent: Oct. 10, 1995

[54] ADAPTABLE DATALINK INTERFACE

[75] Inventors: Peter J. Howells, Byron Center; Donald L. Moore, Dorr, both of Mich.

[73] Assignee: Smiths Industries Aerospace & Defense Systems, Inc., Grand Rapids, Mich.

[21] Appl. No.: 694,900

[22] Filed: May 2, 1991

[51] Int. Cl.⁶ .................................................. G06F 12/14
[52] U.S. Cl. .................... 395/728; 364/DIG. 1; 364/244.3; 364/246.1; 364/246.6; 364/251; 364/253.1; 364/443
[58] Field of Search ................................ 395/725, 425; 364/443, 424.01

[56] References Cited

U.S. PATENT DOCUMENTS

| | | | |
|---|---|---|---|
| 4,101,958 | 7/1978 | Patterson et al. | 395/725 |
| 4,196,474 | 4/1980 | Buchanan et al. | 364/461 |
| 4,312,041 | 1/1982 | DeJonge | 364/442 |
| 4,325,123 | 4/1982 | Graham et al. | 364/413.07 |
| 4,454,510 | 6/1984 | Crow | 342/32 |
| 4,498,131 | 2/1985 | Bratt et al. | 395/400 |
| 4,498,132 | 2/1985 | Ahlstrom et al. | 395/425 |
| 4,510,499 | 4/1985 | Chisholm et al. | 342/456 |
| 4,642,775 | 2/1987 | Cline et al. | 364/443 |
| 4,652,990 | 3/1987 | Pailen et al. | 380/4 |
| 4,706,198 | 11/1987 | Thurman | 364/439 |
| 4,713,757 | 12/1987 | Davidson | 395/800 |
| 4,788,531 | 11/1988 | Corwin et al. | 340/945 |
| 4,811,230 | 3/1989 | Graham et al. | 364/428 |
| 4,819,160 | 4/1989 | Tanka et al. | 395/600 |
| 4,888,698 | 12/1989 | Driessen et al. | 364/443 |
| 5,150,474 | 9/1992 | Kaneko | 395/500 |
| 5,270,931 | 12/1993 | Appleford | 364/424.01 |
| 5,339,423 | 8/1994 | Beitel et al. | 395/600 |

*Primary Examiner*—Jack B. Harvey
*Assistant Examiner*—Ayaz R. Sheikh
*Attorney, Agent, or Firm*—Varnum, Kiddering, Schmidt & Howlett

[57] ABSTRACT

A limited-access computer, such as an on-board flight management computer, stores a first table in a protected area of its memory defining data items in the computer memory which may be accessed, for reading and/or writing purposes, by a user such as an airline operating a ground computer. A second table, in a non-protected area of the memory, is supplied by the user and defines formats of data reading and writing messages to be transmitted by the user and identifying specific data items to be accessed for each message. The items defined by the user in messages in the second table are limited to the set of data items which are defined as accessible data items in the first table. In response to a received user message, the limited-access computer reads the second table to identify data items in the message and on the basis of data item definition information in the first table accesses the identified data item. The user may also supply tables defining trigger conditions and messages to be sent to the user in response to the detection of such a trigger condition by the limited-access computer. The user may modify the user-supplied tables without modification of any critical areas of the limited-access computer.

19 Claims, 8 Drawing Sheets

TABLE 1

| UPLINK ITEM | DESCRIPTION | SCALE | UNITS | FORMAT | MAX. LENGTH |
|---|---|---|---|---|---|
| 6 | FLIGHT NUMBER | N/A | N/A | VAR A-NUM | 10 |
| 7 | DESCENT TRANSITION ALT. | 100 | FT | VAR NUM | 3 |
| 14 | | | | | |
| 21 | CRUISE ALTITUDE | 100 | FT | VAR NUM | 3 |
| 22 | RESERVE FUEL | 0.1 | K LBS | VAR NUM | 4 |
| . | | | | | |
| . | | | | | |
| . | | | | | |

FIG. 7

TABLE 2

| IMI/IEI | UPLINK DATA ITEM IDENTIFIER |
|---|---|
| PWD | |
| . | |
| . | |
| . | |
| REQ | |
| /AA | 6, 7, 14, 22 |
| . | |
| . | |
| . | |
| /KK | 19, 21, 23, 25 |

FIG. 8

TABLE 3

| DOWNLINK ITEM | DESCRIPTION | MAX. LENGTH | SCALE | UNITS | FORMAT |
|---|---|---|---|---|---|
| 5 | FLIGHT NUMBER | 10 | N/A | N/A | VAR A-NUM |
| 10 | | | | | |
| 12 | | | | | |
| 14 | MIN CRUISE TIME | 4 | 1 | MIN | FIXED NUM |
| 16 | | | | | |
| 18 | | | | | |
| 100 | DEP. AIRPORT | 4 | N/A | N/A | VAR ALPHA |

FIG. 9

TABLE 4

| IMI/IEI | DOWNLINK DATA ITEM IDENTIFIER |
|---|---|
| PRG | |
| • | |
| • | |
| • | |
| RES | 100 |
| /NN | 5, 10 |
| • | |
| • | |
| • | |
| /XX | 12, 14, 16, 18 |

FIG. 10

TABLE 5

| TRIGGER NAME | VALUE | DOWNLINK |
|---|---|---|
| ETA CHANGE | 10 | PRG/NN;XX |
| DESTINATION CHANGE | | |
| • | | |
| • | | |
| • | | |

FIG. 11

TABLE 6

| PAGE | KEY | PROMPT TEXT | CONDITIONS | | | | DOWNLINK |
|---|---|---|---|---|---|---|---|
| | | | 1 | 2 | 3 | 4 | |
| n | 1L | X---X | X | X | X | X | PER |
| n | 2R | X---X | X | X | X | | LIM |
| m | 2R | X---X | X | X | | X | LIM/QQ |
| • | | | | | | | |
| • | | | | | | | |
| • | | | | | | | |

FIG. 12

TABLE 7

| 1 | PROMPT ENABLE | ON |
|---|---|---|
| 2 | A/G INTEFACE | UP |
| 3 | DATA BASE | VALID |
| 4 | PERFORMANCE DATA | NORMAL |

FIG. 13

IMI---/IEI----,-----;/IEI---,-----;NTWK ADD

MESSAGE FORMAT

FIG. 14

ADAPTABLE DATALINK INTERFACE

BACKGROUND OF THE INVENTION

1. Field of the Invention

The invention relates to computer communications and more particularly to communications with a limited-access computer for controlling critical functions.

2. Background Art

A number of computers are used to control critical functions, such as controlling an airplane in flight, and access to data in such computers must necessarily be controlled since an unauthorized change in data could have disastrous effects. The same computer which controls critical functions may also be used for more routine functions such as storing noncritical data pertaining to the operating environment. In the context of in-flight computers, referred to as flight management computers, these have become an important part in the operation of all modern airplanes. The flight management computer reduces pilot workload by relieving the pilot of more mundane management tasks and automatically controls the airplane in four dimensions from just after takeoff to just before landing. Before the flight begins, the flight management computer must be initialized by the entry of such information as the intended route, the selected cruise altitude, and airplane gross weight. Before or during a flight, the pilot may enter additional data to fine tune the selected profile. Data such as winds aloft, although not required, enable the computer to more accurately predict estimated times of arrival. During the flight, the pilot may be required to report the expected time of arrival as well as changes in the expected time of arrival due to delays, since such information is of great importance to airlines operating the aircraft or air traffic control. The computer, and its programs and data structure, are typically certified by an appropriate regulatory agency before being approved for use as an in-flight control computer.

Prior art arrangements are known for communicating with on-board flight management computers via a ground computer and a standard air-to-ground data connection. These communications include messages from the ground computer to the on-board computer, referred to as uplinks, and messages from the on-board computer to the ground computer, referred to as downlinks. Typically, these messages have included a so-called imbedded message identifier (IMI) used to designate the type of data in the message. Another designator referred to as an imbedded element identifier (IEI) identifies the data elements within each message. Inside the on-board computer are a number of processing routines, each of which was dedicated to processing a separate IMI/IEI. In prior art systems, these routines are typically hard coded in the on-board computer and any change in the message format, such as the addition of an IMI/IEI combination requires modification of the on-board computer and recertification by the appropriate regulatory body. Such modification and recertification is both expensive and time consuming.

In the prior art system the on-board flight management computer was typically programmed to periodically transmit information to the ground computer in the form of a downlink message. Such a downlink message is initiated on the basis of the occurrence of a predefined trigger condition or in response to a pilot selection from a predefined prompt display. In the latter case, the flight management computer, in response to predetermined trigger conditions, provides a prompted display to the pilot and upon an indication that a particular item has been selected, the on-board computer transmits the selected information to the ground computer. In the prior art system, it is not possible to change the trigger conditions which control the prompt display or the direct trigger response without modification of the hard coded area of the on-board computer and recertification.

SUMMARY OF THE INVENTION

These and other problems of the prior art are overcome in accordance with this invention by defining in the limited-access computer, such as a flight management computer, a table of data items to which a user, such as an airline, may be granted access and a user-provided table which identifies messages to be employed by the user and data items associated with each user message. In response to a user message, the computer examines the user-provided table to identify data items associated with a message and, in response to the message, accesses only those data items which are found in the table defining user-accessible data items. To protect the integrity of the system, the table defining user accessible data items may be hard coded or otherwise stored in a protected memory area of the computer and certified by the proper regulatory agency. Advantageously, the table supplied by the user may be stored in a non-protected memory area and may be changed at the convenience of the user to introduce message changes without the need for physical modification or recertification of the computer.

In a specific embodiment of the invention, an aircraft flight management computer has a protected area of memory, which may for example be a well-known read-only memory in which an uplink data item access table is stored defining data items which are accessible to an airline for purposes of entering data in the computer in response to an uplink message. The airline may provide a table listing IMI and IEI designators which the airline expects to use in its uplink messages from a ground computer and the identifiers defining data items included with each IMI or IEI. The data item identifiers in the user-supplied table are checked against the table of data items accessible by uplink messages. The on-board computer, in response to receiving an uplink message, uses the IMI/IEI designators in the message to access the user-supplied table and from that table determines the identity of data items in the received uplink message. Data items from an uplink message are entered in the computer only if the data item identifier in the user-supplied table is also in the table of accessible data items. In addition to storing data item identifiers defining accessible data items, the table in the protected part of memory includes address and format conversion information. The on-board computer uses such data to determine the proper internal memory location to be addressed and converts the data items in the message from message format to a format consistent with the format of the computer.

In one particular embodiment of the invention, the received message will include data type information and the onboard computer will sort message data items by type and display the sorted items on a display device for review by the pilot prior to entering data items received from the ground computer in the memory of the on-board computer.

In accordance with a specific embodiment of the invention, the on-board computer has a downlink data item access table defining data items which may be accessed by a user for purposes of reading the data items. In response to detecting a data transmission request defined by the user, which will include information identifying data items to be transmitted, the onboard computer checks the table of accessible data items. Requested data items included in that table are transmitted in response to the request message. The data request may be in the form of a data message transmitted from the ground computer by the user. Furthermore, the user may define a trigger table to be stored in the non-protected area of the on-board computer defining at least one trigger condition and information identifying a data item to be transmitted when the trigger condition occurs. The data request including information identifying requested data items is defined by one of the trigger conditions in the trigger table. In a further embodiment of the invention, the on-board computer includes a display device and keys associated with the display device for generating an output signal. A prompt table, defined by the user, defines prompt display conditions, a prompt header to be displayed on the display device and information identifying a data item to be transmitted. When a threshold condition defined in the prompt table has been met, a corresponding prompt header is displayed on the display device. The data defined in the prompt table in association with the pertinent trigger condition is transmitted to the ground computer after an appropriate signal has been detected from the display device. Advantageously, in accordance with this invention, trigger conditions may be specified and modified by the user. Furthermore, elements of the trigger tables may be modified remotely by means of an uplink message.

Data items to be associated with a data request may be identified by means of IMI/IEI message identifiers in the data request. An airline-supplied downlink table, stored in the onboard computer, lists the message identifiers and corresponding data item identifiers. When a data request is to be handled, the user-supplied downlink table is searched for the message identifier defined in the request message, and data items identifiers associated therewith in the table are compared with data item identifiers in the table of items which may be accessed by downlinks. Only data items corresponding to data item identifiers found in that table are transmitted.

Advantageously, the trigger table and prompt table as well as the airline-supplied downlink table may be stored in a non-protected area of memory accessible to the airline.

Advantageously, in accordance with this invention, a user is provided with a flexible way of accessing a limited-access computer, for both reading and writing of data. More specifically, the user may conveniently alter message formats between a user computer and the limited access computer without modification to the limited-access computer other than by redefinition of tables stored in a noncritical area of the limited-access computer and further, may define and redefine threshold conditions within the critical access computer or its data as triggers for certain actions to be taken by the limited-access computer. Furthermore, such trigger-related data may advantageously be remotely modified by means of an uplink data message.

BRIEF DESCRIPTION OF THE DRAWING

An illustrative embodiment of the invention is described below with reference to the drawing in which.

DETAILED DESCRIPTION

Figure 1:
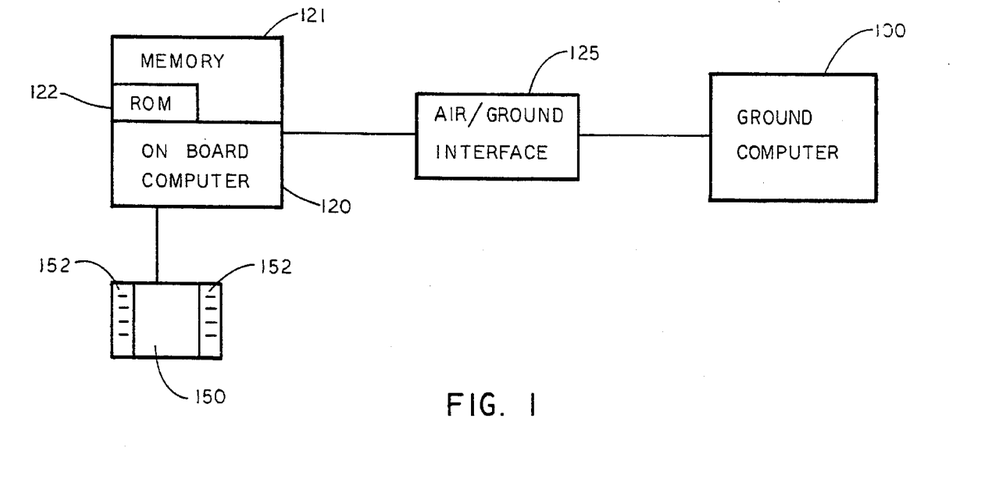
FIG. 1 is a block diagram representation of a system including an on-board computer and a ground computer.

FIG. 1 is a block diagram representation of a multiple computer arrangement commonly used, for example, in ground-to-air communications. The system includes a host ground computer 101 and an on-board computer 120 linked to the ground computer 101 via a standard air-to-ground communications interface 125. The ground computer may send messages referred to as uplinks to the on-board computer defining certain functions to be performed by the on-board computer and the on-board computer may send messages referred to as downlinks to the ground computer to provide data to the ground computer. The on-board computer 120 includes a memory 121 for storing commands and data. Since the on-board computer is typically used for flight control and related sensitive functions, certain programs and data are protected and not accessible by users of the ground computer. Such information may, for example, be stored in a read-only memory (ROM) 122. Other general areas of the memory 121 may be read or altered by the on-board computer 120 by ground computer users on a restricted basis. A number of tables, tables 1 through 7 shown in FIGS. 7 through 13, respectively, are used by computer 120 in communications with the ground computer 101. Tables 1 and 3 are referred to herein as the uplink item definition table and the downlink item definition table, respectively. These tables define data items which may be accessed via the ground computer 101 and include symbolic address and format definition information. Tables, such as tables 1 and 3, may be prepared for the flight computer of, for example, a specific type of aircraft which may be in use by a number of different airlines and are preferably stored in the read-only memory 122. Only data items defined in these tables are accessible to the airlines. Tables 2 and 4 are referred to herein as the uplink and downlink message definition tables, respectively. These tables identify the data items associated with each of the message identifiers in the uplink and downlink messages.

Each of the different airlines may have control of a ground computer, such as computer 101, and may wish to communicate with the on-board computer for different purposes. In accordance with this invention, a user, such as an airline, may supply message definition tables, e.g., tables 2 and 4, for entry in the non-protected area of memory 121. These tables may define uplink and downlink formats for messages which the airline intends to use in air-to-ground communication including an identification of data items to be associated with the messages. In this manner, a number of different airlines or other organizations can communicate with the on-board computer using different message sets. The message definition tables allow the various users to define their own message formats and a message may include a plurality of items to be acted upon without the necessity of complex message interpretation schemes. The tables may, for example, be loaded into the on-board computer from a standard disk while the aircraft is on the ground.

In the present illustrative system, the user-supplied tables are formatted by means of a packing program prior to being entered in the on-board computer. To prevent access to restricted areas of the computer and its memory, the packing program executes a checking routine which ascertains that only data items identified as user-accessible items in the uplink/downlink item definition tables are included in the user-supplied tables. Alternatively, the computer may execute such a test routine before accessing any data item defined in the user-supplied tables in response to an uplink or downlink request.

One of the functions to be performed by the on-board computer 120 is to enter new data in its memory in response to an uplink message from the ground computer 101 defining one or more data items. The on-board computer first consults the uplink message definition table to identify the data items included in the message and reads corresponding entries of the uplink data item definition table in ROM to obtain further item definition information. For safety and control purposes, it may be desirable for the pilot to review the data items before such are entered into the computer and acted upon by the computer. For this reason, data items to be entered are displayed to the pilot on a standard aircraft display device 150. The message requesting data entry may include data items of a number of different types and the data items are sorted by type in the on-board computer 120. All items of the same type may then be displayed to the pilot simultaneously for review. The display device 150 is provided with a plurality of entry keys 152 and by activating an appropriate accept/reject key, the pilot indicates that the displayed item should be entered or rejected.

The on-board computer may be stimulated to transmit certain data to the ground computer, This may be done in response to a downlink request which defines certain data items to be transmitted in a downlink. The procedure is similar to the procedure used in connection with the uplink. The request will define a downlink message identifier. The on-board computer reads the downlink message definition table to obtain data item identification information and reads the downlink item definition for further definition of the data item to be sent. A request may be in the form of a request message included in an uplink message. A downlink may also be initiated upon the occurrence of certain automatic triggers which are monitored by the on-board computer. A trigger table, table 5, defined by the user operating the ground computer and entered in the non-protected area memory of the on-board computer defines what trigger activity is to be transmitted to the ground computer and the identity of the downlink data message. A further method of transmitting data to the ground computer is in response to a prompt selection from the pilot at the display device 150. A prompt table, table 6, is used in cooperation with a prompt condition table, table 7, to define a prompt header to display to the pilot on the display device 150. Both of these tables may be defined and modified by the user. If a pilot activates one of the keys 152 associated with a displayed item, a downlink message is prepared for transmission to the ground computer with reference to the downlink message definition table. The trigger table, the prompt table and the prompt condition table may be modified by means of an uplink message without the need to perform the standard memory loading routine by loading an updated disk in the computer.

Figure 2:
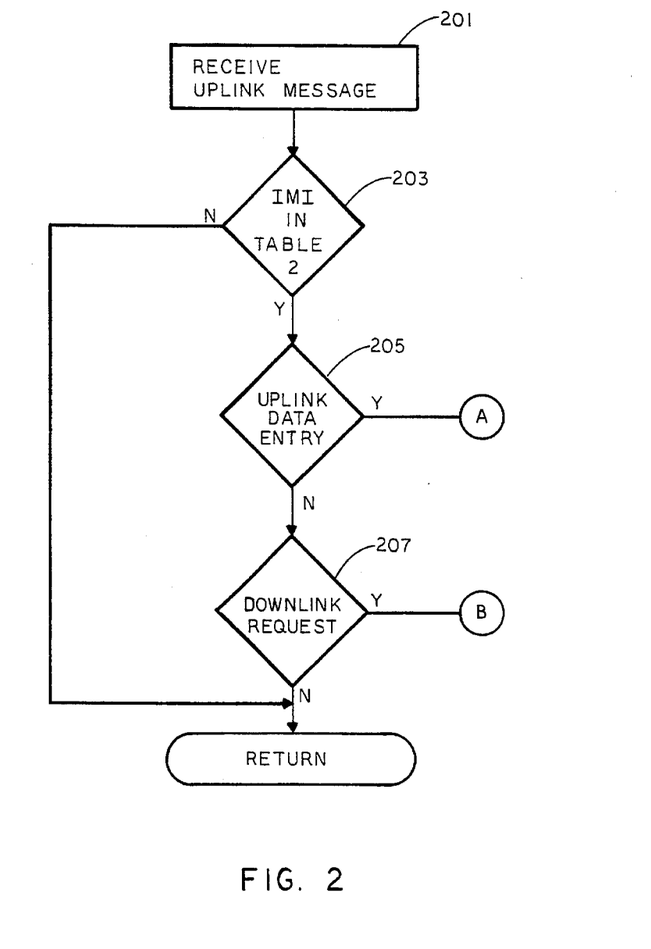
FIGS. 2 through 4 form a block diagram representation of functions performed by the on-board computer in response to messages from the ground computer.
Figure 3:
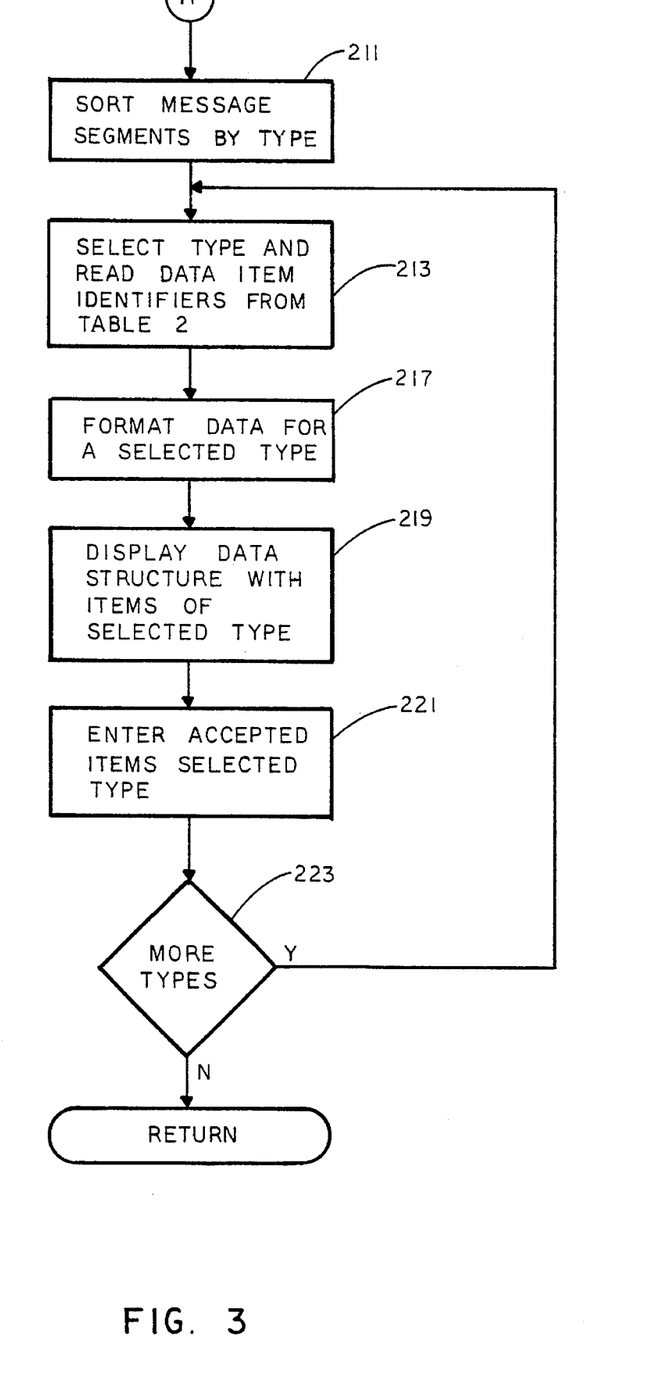
Figure 14:
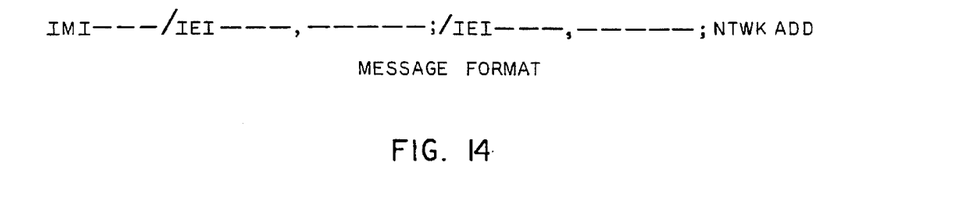
FIG. 14 is a representation of an exemplary message format for messages between the on-board computer and the ground computer.

FIGS. 2 through 6 are flow chart representations of functions performed by the on-board computer 120 in communicating with the ground computer 101. FIG. 2 in block 201 represents receipt of an uplink message from the ground computer 101. The general message format is shown in FIG. 14. In this illustrative system, the message includes an imbedded message identifier (IMI) which may be followed by a data element identifier and/or an imbedded element identifier (IEI) which may be followed by data elements and further IEIs. Further included is a network address identifying a source or destination in the ground computer system or network. If the on-board computer is not ready to process incoming uplink messages, they may be temporarily stored in a queue on a priority basis in a well-known fashion. The priority may be assigned on the basis of a message type, discernable from the IMI, or on the basis of the network address. In block 203 of FIG. 2, a test is made to determine whether the IMI of the message is in table 2 (FIG. 8) which represents the uplink message definition provided by the airline. In this particular example, table 2 lists IMIs as PWD through REQ and IEIs as AA through KK. The IEIs are identified by a solidus (/). If the IMI is not in this table, the uplink message will be ignored. If it is in the table, further tests are conducted, as indicated in decision blocks 205 and 207, to determine if the IMI in the message represents an uplink data entry request or a request to downlink certain data identified by REQ. If it is a data entry request, an advance will be made to block 211 in FIG. 3. The message may include several IEI. As indicated in block 211, the IEI are sorted by type to allow items of the same type to be displayed together for pilot review. Thereafter, as indicated in block 213, one of the types is selected and the data item identifiers associated with the selected message portions are read from the uplink message definition table, table 2, which identifies the data elements associated with each IEI. With reference to tables 1 and 2 in FIGS. 7 and 8, it will be apparent that a message having an IMI of PWD and having an IEI of AA is expected to be followed by data items identified by numbers 6, 7, 4, and 22 as shown in table 2. Table 1 includes such items and further provides a description of the item as well as other data such as a scaling factor for numerical values, the units in which the numerical values are expressed in the table, data format and maximum length information. The description data may be used as a symbolic address defining the memory address where the data is ultimately to be entered. Format information defines whether the data is numerical, alphanumeric, etc., and whether the item has a fixed length or variable length. The maximum length information may be used to check that the data items accompanying the IEI in the message do not exceed the stated length. In block 217, the data of table 1 is used to convert the data items in the message to a format, including text, which is acceptable to the on-board computer and understandable by the pilot. In block 219, a data structure which includes the data items of the selected type is displayed to the pilot so that the pilot may understand the context of the data. If the pilot indicates acceptance of a newly displayed data item by depressing one of the keys 152 on the display device 150, the accepted item will be entered in the memory of the on-board computer as indicated in block 221. A test is made in block 223 to determine if there are more data types to be examined. If not, the data entry routine is terminated.

Figure 4:
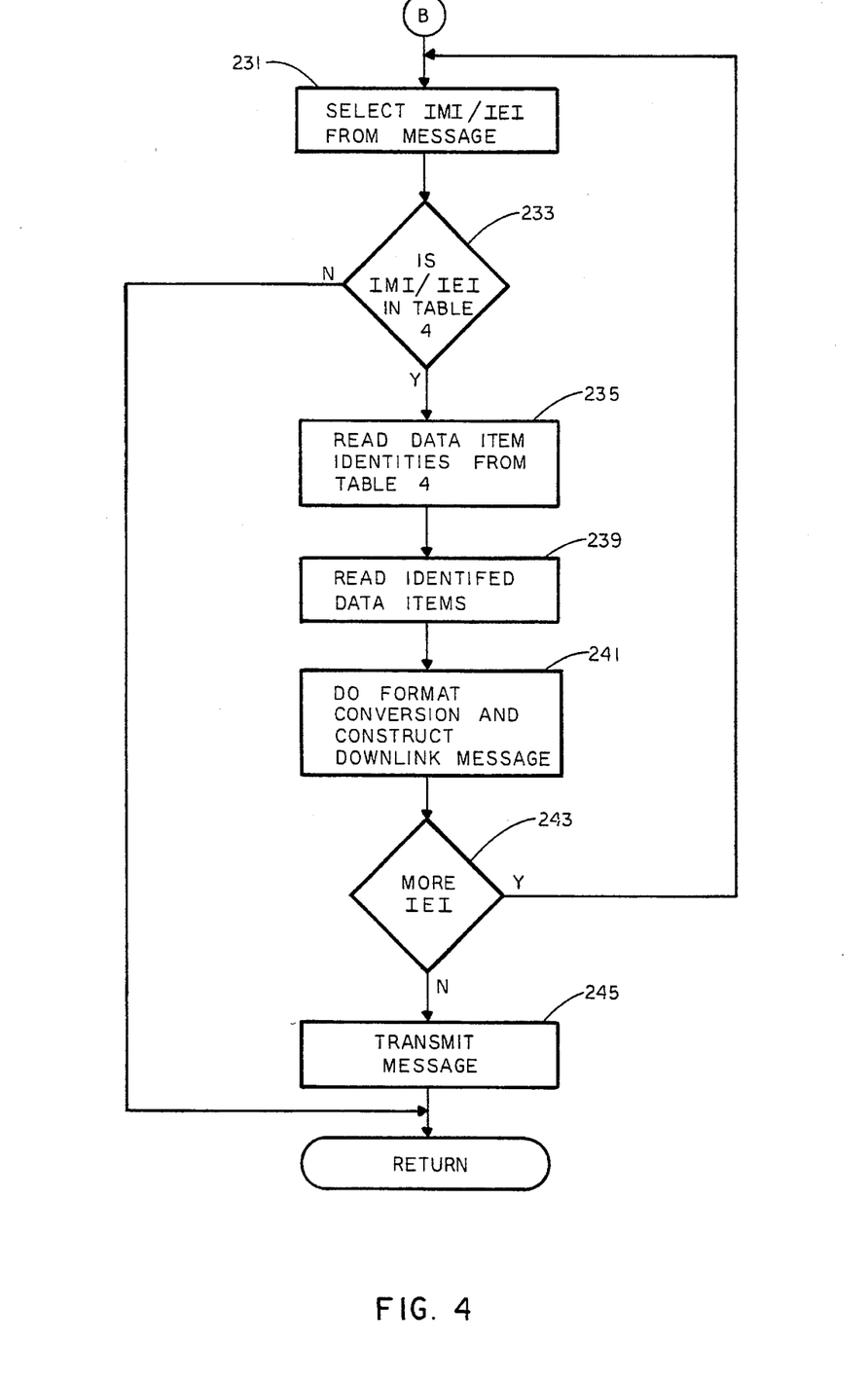
Figure 7:
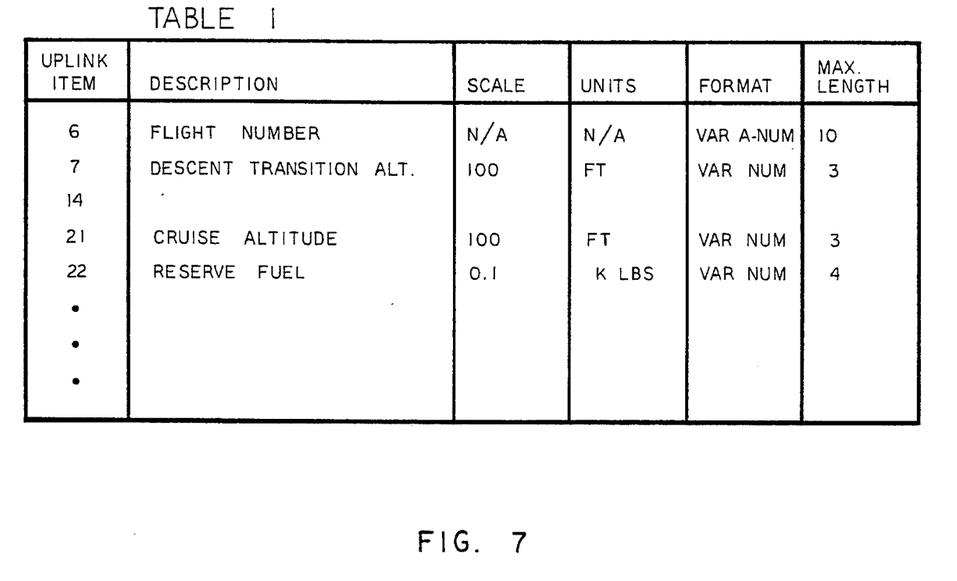
FIGS. 7 through 13 are representations of tables used by the on-board computer.
Figure 8:
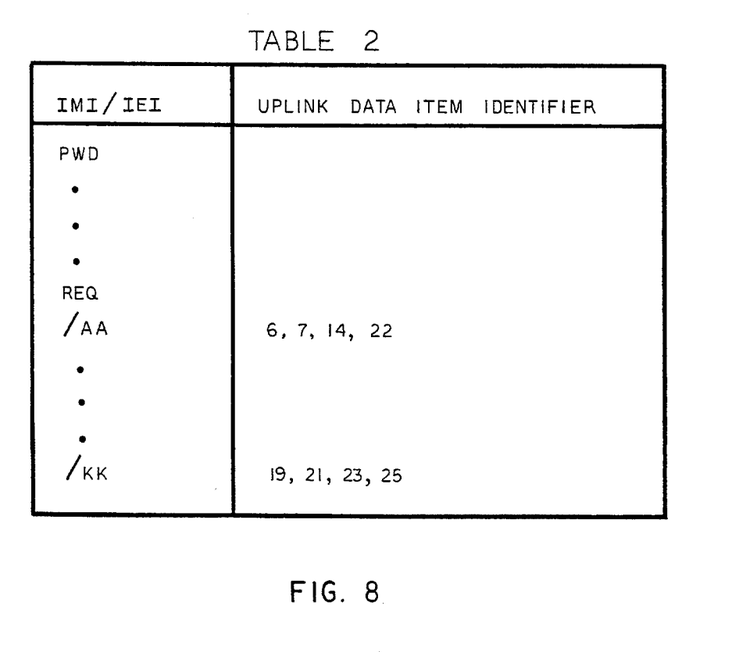
Figure 9:
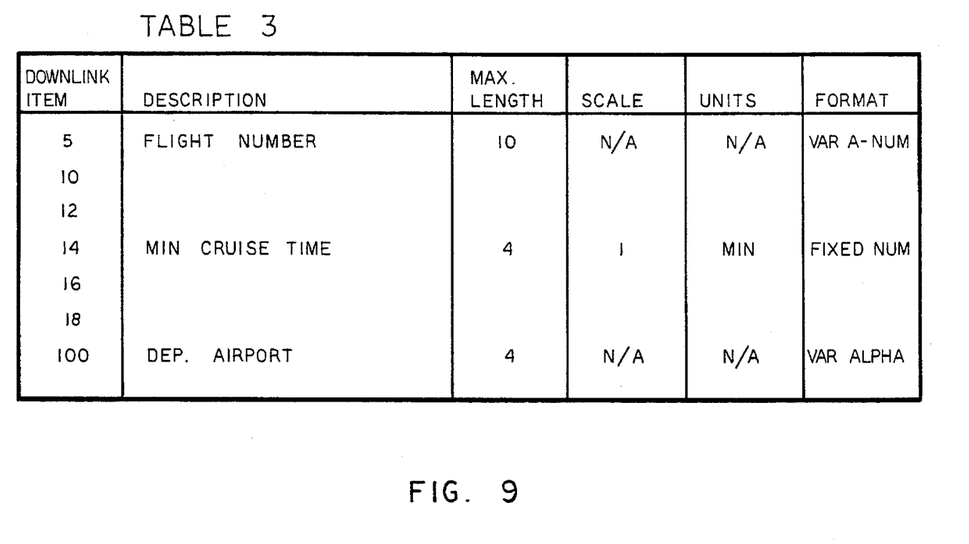
Figure 10:
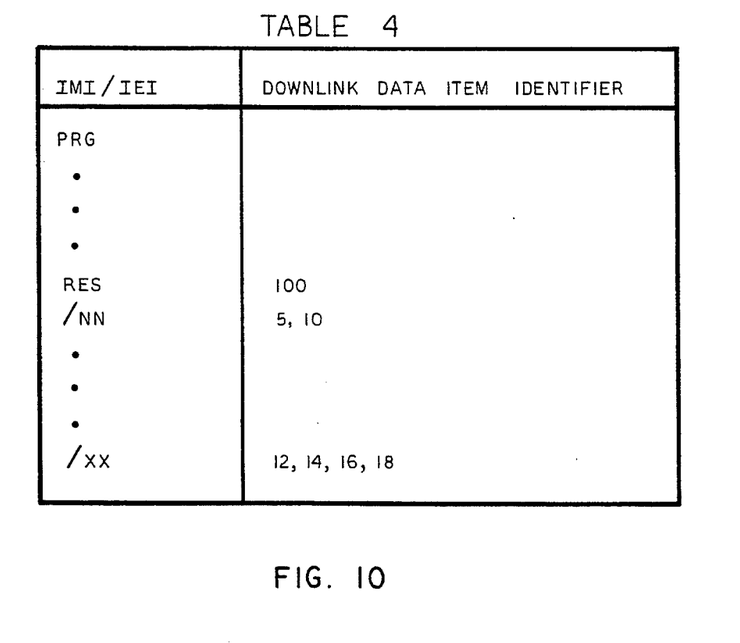

If it is determined in block 207 of FIG. 2 that the received IMI indicates that this is a request for a downlink, a transfer is made from block 207 to block 231 in FIG. 4. Such a downlink request message includes a definition of the downlink message to be transmitted. It will typically include an IMI and one or more IEI, which serves to identify data items to be transmitted in the downlink message. The IMI or an IEI is selected in block 231. In block 233 of FIG. 4, a test is made to determine if the IMI or selected IEI is in the downlink message definition table, table 4, defined by the user of the ground computer and entered into the non-protected area of memory 121. Table 4, which is shown in FIG. 10, identifies specific data items to be included in a downlink message for a particular IMI or IEI. Table 3, shown in FIG. 9, lists downlink data item identifiers as well as related item definition information similar to that of table 1 (FIG. 7). It includes a description, character length and conversion scale as well as format and units data. The identifier serves as a symbolic address in the memory of the on-board computer and the other information is used for data checking purposes and to define the format conversion to be performed prior to transmission of the data item. Data items identified in table 4 are read from memory as indicated in block 239. A format conversion is performed in block 241 and the result is used to construct the downlink message. A test is made in block 243 to determine if more IEI are in the downlink request message. If so, the previously discussed steps are repeated until all IEI of the message have been appropriately handled. Thereafter, the message is transmitted as indicated in block 245 and the routine is terminated.

Figure 5:
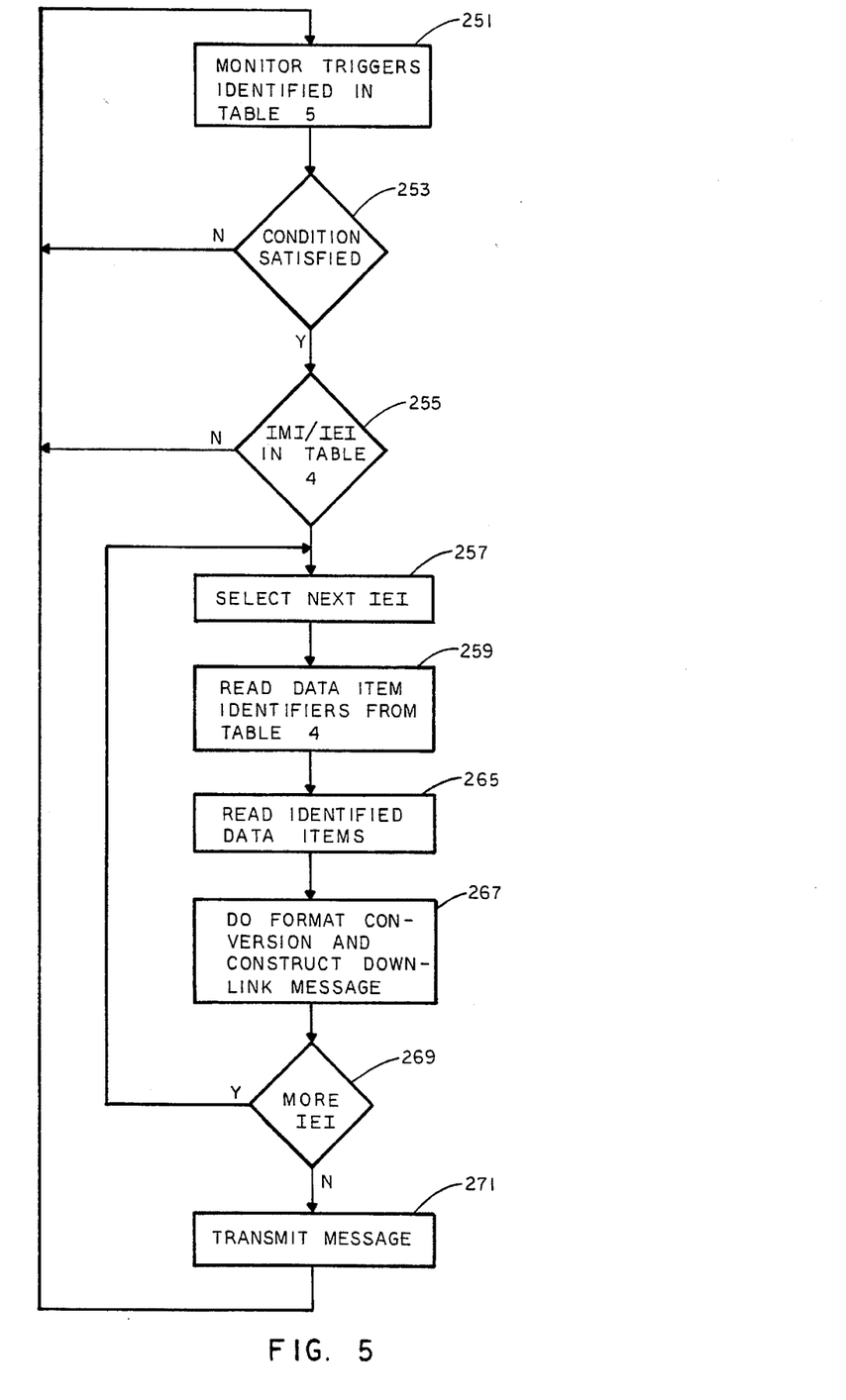
FIGS. 5 and 6 are block diagram representations of functions performed by the on-board computer in response to the occurrence of predefined conditions.
Figure 11:
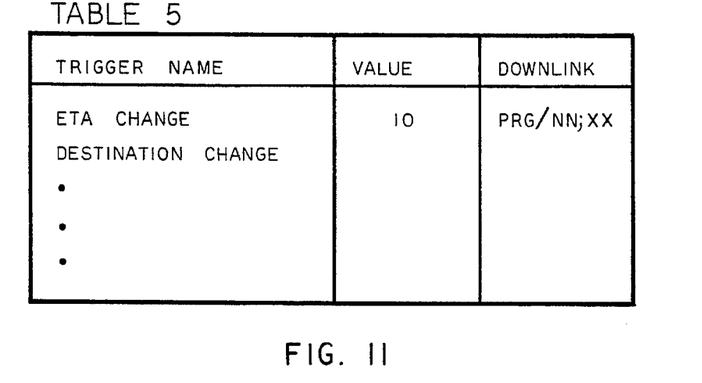

As indicated earlier, the on-board computer 120 is provided with a number of triggers which generate an output indication upon the occurrence of certain conditions detected in the on-board computer in a well-known fashion. Table 5, FIG. 11, is a trigger table provided by the ground computer user and stored in the non-protected area of the memory 121. It defines downlink messages to be transmitted when the particular triggers identified in table 5 occur. By way of example, one trigger defined in table 5 is a change in the estimated time of arrival recorded in the computer. If the value of the change is greater than a threshold value, e.g., 10 minutes, a downlink is to be sent. Table 5 identifies the IMI/IEI of the downlink to be sent. Other triggers might be changes in destination, altitude or the like. FIG. 5 is a flow chart representation of functions performed by the on-board computer in response to a trigger event which is identified in the user-provided table 5 in FIG. 11. As indicated in block 251 of FIG. 5, the on-board computer monitors the triggers identified in table 5. In block 253, a test is made to determine whether the conditions for any of the triggers identified in table 5 is satisfied. If not, monitoring continues. But if so, a further test is made in decision block 255 to determine whether the IMI/IEI defined in association with the trigger in table 5 are present in the downlink message definition table, table 4 (FIG. 10). If the IMI/IEI under test is not in table 4, the trigger condition is ignored. A downlink message, like an uplink message, may have more than one IEI and in block 257, a particular IEI for a downlink to be transmitted is selected. In block 259, data item identifiers associated with the selected IEI in table 4 are obtained. Thereafter, an advance is made to block 265. Here, table 3 (FIG. 9) is addressed and the data items corresponding to the data item identifiers listed in table 4 are read from memory. The data item definition information of table 3 is used to perform format conversion and to construct the appropriate downlink message, as indicated in block 267. In decision block 269, an additional test is performed to determine whether there are other IEIs for this downlink message. If so, return is made to block 257 to select the next IEI, if not, the message is transmitted, as indicated in block 271.

Figure 6:
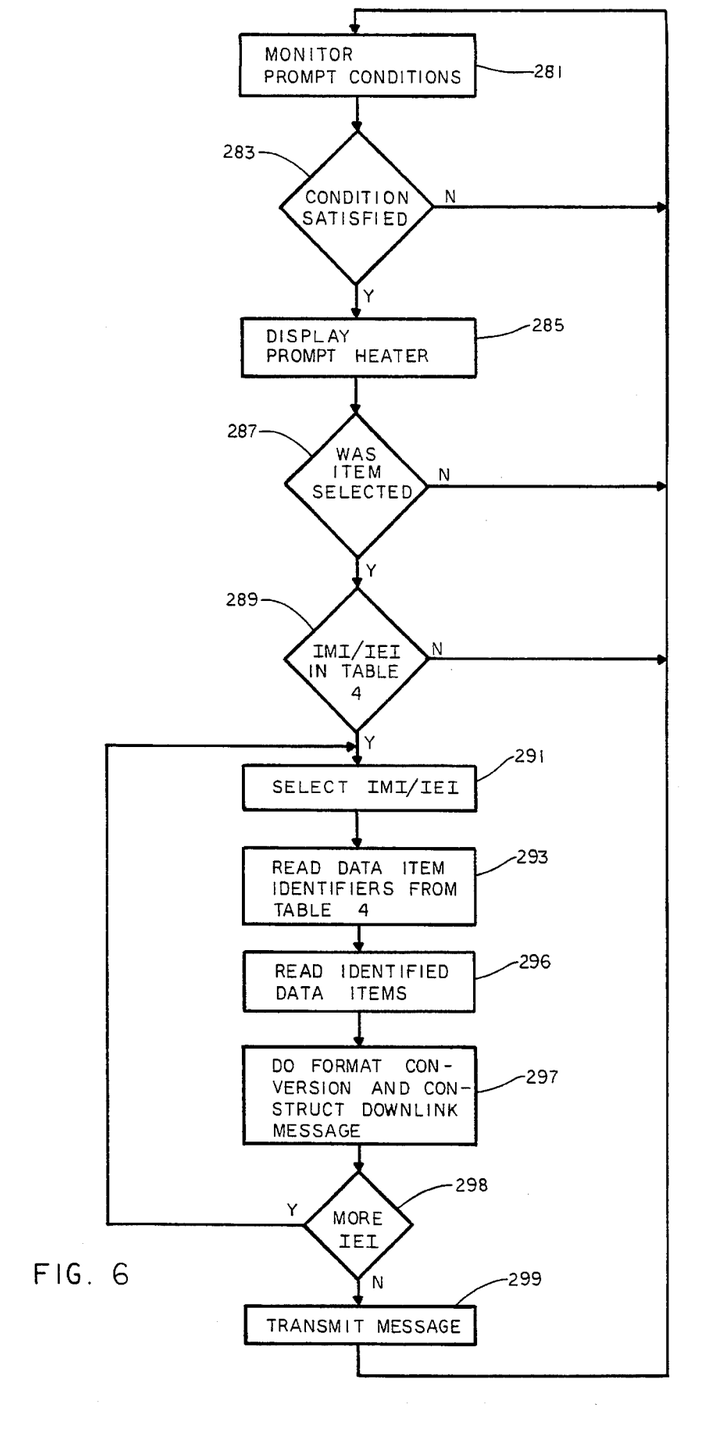
Figure 12:
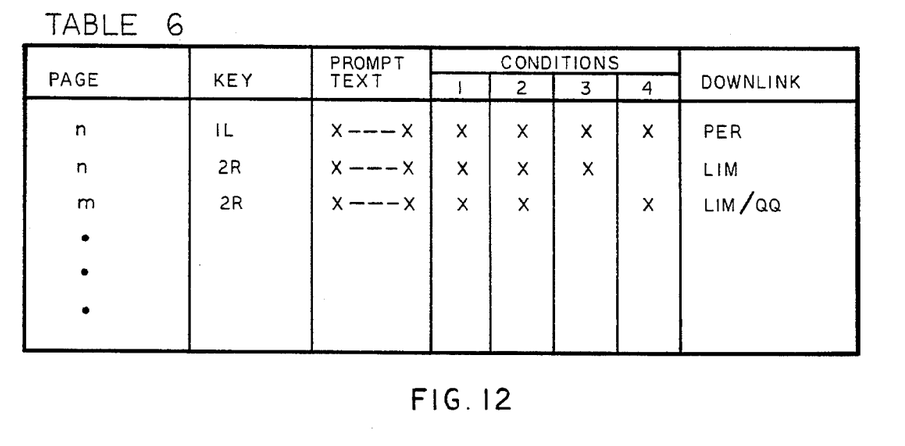
Figure 13:
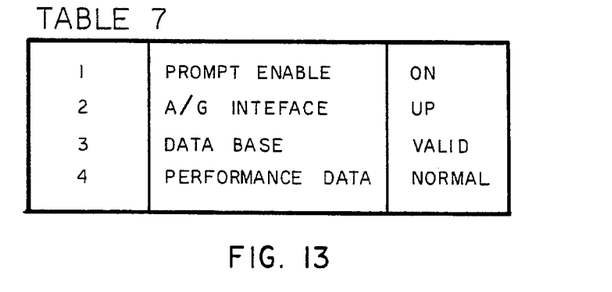

As indicated earlier herein, a downlink message may be sent in response to a prompt trigger. Table 7 in FIG. 13 is a prompt display condition table and indicates various points to be examined in connection with the prompt triggers. Table 6 of FIG. 12 shows the conditions of the various points of table 7 under which the prompt is to be displayed. The data of tables 6 and 7, like that of tables 2, 4, and 5, are supplied by the user of the ground computer and are loaded in a non-protected area of memory. Tables 5, 6, and 7 may be modified by the user by means of an uplink message, if desired. FIG. 6 is a block diagram representation of functions performed by the on-board computer with respect to the prompt triggers. Block 281 indicates monitoring the prompt conditions defined in table 6 and a test is made in block 283 to determine when the conditions are satisfied. If satisfied, the prompt header is displayed as indicated in block 285. Table 6 defines the display page, the prompt text to be displayed to the pilot and a key identification, such as one of the keys 152 on a display device 150, which, when actuated by the pilot, indicates that an item identified by the prompt header was selected to be transmitted. A test to determine whether an item was selected is indicated in block 287 of FIG. 6. Monitoring is resumed if the pilot does not select the displayed item. If an item is selected by the pilot, a downlink message has to be transmitted to the ground computer. The IMI/IEI for the downlink to be transmitted is defined in table 6 of FIG. 12. As indicated in decision block 289, a test is made on the IMI/IEI of table 6 to determine whether these are found in the downlink message definition table, table 4, which identifies data items to be associated with specific IMI/IEI. If either the IMI or IEI is not found in table 4, a return is made to block 281 to resume monitoring. If the IMI and one or more IEIs defined in table 6 are found in table 4, one of the IEIs is selected as indicated in block 291. Thereafter, the data item identifiers found in table 4 in association with a selected IMI/IEI are read. Corresponding identifiers listed in the downlink data item definition table, table 3, in the read-only part of memory, are read and the information of table 3 is used in reading the data items from memory, as indicated in block 296. Using further data in table 3, a format conversion is performed and a downlink message is constructed as indicated in block 297. Subsequently, another test is performed to determine if there are more IEI as indicated in decision block 298. If so, another one of these will be selected. If no more are to be handled, the downlink message is transmitted as indicated in block 299.

It is to be understood that the above-described arrangement is merely an illustrative application of the principles of the invention and that numerous other arrangements may be devised by those skilled in the art without departing from the spirit and scope of the invention.

What is claimed is:

1. The method of controlling access to a limited-access computer comprising the steps of:

storing a first table not accessible to a user and defining data item identifiers identifying data items which may be accessed by a user and related data item definition information associated with each data item identifier;

storing a second table defined by the user and comprising at least, item identifier defined in the first table and at least one message identifier stored in association with the at least one data item identifier;

receiving a message in the computer including a message identifier and at least one message data item to be entered in the computer;

in response to receiving the message, searching the second table and identifying a data item identifier stored in the second table in association with a message identifier corresponding to the received message identifier;

searching the first table for a data item identifier corresponding to the data item identifier identified in the second table; and entering the received message data item in the computer in accordance with related data item definition information stored in the first table in association with the data item identifier identified in searching the second table only if a corresponding data item identifier, corresponding to the data item identified in the second table, is found in the step of searching the first table.

2. The method in accordance with claim 1 wherein the related data item definition information in the first table includes address information and format conversion information and wherein the step of entering the received message data item in the computer includes the step of converting the received message data item from a first data transmission format to a second format in accordance with the format conversion information in the first table and the step of storing the received message data item in the computer in accordance with the address information contained in the first table.

3. The method in accordance with claim 1 wherein the received message includes a plurality of message data items and data item type information and wherein the method further comprises the step of sorting the message data items by type before entering message data items in the computer.

4. The method in accordance with claim 3 and further comprising the step of displaying message data items to be entered on a display device and waiting for an entry confirmation signal from the display device before entering the message data items in the computer.

5. A method of controlling access to a limited-access computer in response to a data request message, the method comprising the steps of:

storing a first table not accessible to a user and identifying data item identifiers defining data items in the computer which may be accessed by a user and related data item definition information associated with each data item identifier;

storing a second table defined by the user and comprising at least one data item identifier defined in the first table and at least one message identifier stored in association with the at least one data item identifier;

receiving from a user a data request message including a message identifier defining a message to be transmitted;

in response to receipt of the data request message, searching the second table for a message identifier corresponding to the message identifier of the data request message and identifying a data item identifier stored in the second table in association with the corresponding message identifier;

searching the first table and identifying a data item identifier stored in the first table and corresponding to the data item identifier identified in the second table; and transmitting to the user a data item corresponding to the identified data item identifier stored in the second table and defined by the related data item definition information stored in the first table in association with the identified data item identifier, only if the data item identifier identified in the first table is found in the second table.

6. The method of accessing a limited-access computer comprising the steps of:

storing a first table of data item identifiers identifying data items in the computer which may be accessed by a user and defining related data item definition information stored in association with each data item identifier;

storing a second table defined by the user comprising at least one message identifier and at least one data item identifier in association with the message identifier and defining a data item;

storing a trigger table defined by the user and including at least one trigger condition parameter defining a trigger condition for a specified data item and at least one message identifier;

periodically examining the specified data item for a trigger condition defined by the at least one trigger condition parameter; and in response to the detection of a trigger condition defined by the at least one trigger condition parameter, performing the following steps;

searching the second table for a message identifier corresponding to the message identifier defined in the trigger table in association with a trigger condition parameter corresponding to the detected trigger condition and identifying a data item identifier in the second table in association with the corresponding message identifier;

searching the first table for a data item identifier corresponding to the identified data item identifier; and transmitting to a predefined destination a data item corresponding to the identified data item identifier stored in the second table and defined by related data item definition information found in the first table in association with the identified data item identifier.

7. The method in accordance with claim 6 and further comprising the step of transmitting to the computer a data message defining a trigger condition parameter and the step of entering data defined by the data message in the trigger table.

8. In a remotely accessible limited-access computer system, a method of controlling access to the computer comprising the steps of:

storing in the computer a first table of data items which may be accessed by a user and related data item definition information associated with each data item identifier, a second table defined by the user comprising at least one message identifier and at least one data item identifier in association with the message identifier and defining a data item, and a prompt table defined by the user and identifying at least one prompt condition defining a condition for a specified data item requiring the display of prompt information and an associated message identifier;

periodically examining the specified data item for a prompt condition defined in the prompt table; and in response to the detection of a prompt condition defined in the prompt table, displaying prompt information on a display device;

in response to a signal indication from the display device, performing the following steps:

searching the second table for a message identifier corresponding to the message identifier defined in the prompt table in association with the detected prompt condition and identifying a data item identifier in association with the message identifier stored in association with a corresponding message identifier;

searching the first table for a data item identifier corresponding to the identified data item identifier; and transmitting to a predefined destination a data item defined by the identified data item identifier in the second table and related data definition information stored in the first table.

9. In a limited-access computer comprising a first table not accessible to a user and defining data item identifiers identifying data items which may be accessed by a user and defining related data item definition information associated with each data item identifier and a second table defined by the user and defining at least one message identifier and at least one data item identifier in association with the message identifier, a method of controlling access to the computer comprising the steps of:

receiving a message in the computer including a message identifier and at least one message data item to be entered in the computer;

in response to receiving the message, searching the second table and identifying a data item identifier stored in the second table in association with a message item identifier corresponding to the received message identifier;

searching the first table for a data item identifier corresponding to the identified data item identifier; and entering in the computer a message data item identified in the second table in accordance with related data item information stored in the first table, only if the identified data item is found in the second table.

10. In a limited-access computer comprising a read-access table defining data item identifiers identifying stored data items which may be read by a user, a method of controlling access to the computer via data link from a remote location, the method comprising the steps of:

detecting a data transmission request defined by the user and received from the remote location via the data link, the request including data item identifiers identifying stored data items to be transmitted by the computer in response to the data transmission request;

in response to detecting the data request, searching the read-access table for a data item identifier corresponding to the data item identifier included in the request; and transmitting a data item identified in the read-access table to the remote location via the data link only if a data item identifier corresponding to the data item identifier included in the request is found in the read-access table.

11. The method in accordance with claim 10 wherein the computer further comprises a second table defined by the user defining at least one message identifier and at least one data item identifier stored in association with the message item identifier and wherein the data request comprises a message identifier identifying a message to be transmitted, the method further comprising, in response to receipt of the data request message, the step of searching the second table for a message identifier corresponding to the message identifier of the data request and identifying a data item identifier stored in the second table in association with the corresponding message identifier and wherein the step of searching the read-access table comprises searching for a data item identifier corresponding to the data item identifier identified in the search of the second table and wherein the step of transmitting comprises transmitting the data item identified by the data item identifier in the second table.

12. The method in accordance with claim 11 and further comprising the steps of storing the read-access table in a protected memory area of the limited-access computer and storing the second table in a non-protected memory area of the limited access computer.

13. The method in accordance with claim 11 and further comprising the step of comparing data items identified in the second table with data items identified in the read-access table and wherein a data item identified in the second table is transmitted only if a corresponding data item identifier is found in the read-access table.

14. The method in accordance with claim 10 wherein the data request comprises a data message transmitted to the computer by the user and information identifying a data item to be transmitted.

15. The method in accordance with claim 10 wherein the computer further comprises a trigger table defined by the user defining at least one trigger condition and information identifying a data item to be transmitted wherein the data request is defined by one of the trigger conditions defined in the trigger table and wherein the method further comprises the step of detecting a trigger condition corresponding to a trigger condition defined in the trigger table.

16. The method in accordance with claim 10 and wherein the computer comprises a display device including signal-generating circuitry responsive to operation of keys associated with the display device for generating an output signal and comprising a prompt table defined by the user defining prompt conditions, prompt information to be displayed on the display device and information identifying a data item to be transmitted, wherein the data request is defined by a prompt condition in the prompt table and the output signal from the display device, wherein the method further comprises the steps of detecting a prompt condition defined in the prompt table, displaying on the display device prompt information defined in association with the detected prompt condition in the prompt table, and detecting an output from the display device before transmitting any data item.

17. The method in accordance with claim 10 wherein the read-access table comprises related data item definition information and the step of transmitting comprises transmitting the requested data item in accordance with related data item definition information stored in the read-access table.

18. An on-board, limited-access flight control computer system accessible to a user by datalink messages including a message identifier, the flight control computer system comprising:

a read-only memory not accessible to the user and a first table in the read-only memory defining a plurality of data item identifiers, each data item identifier identifying a data item which may be accessed by the user, and defining data item definition information in association with each data item identifier;

a random-access memory and a second table in the random-access memory defined by the user and alterable under control of the user, the second table comprising a plurality of message identifiers and one or more data item identifiers associated with each message identifier;

a computer connected to the read-only memory and the random-access memory and responsive to receipt of a datalink message including a message identifier to search the second table for a message identifier corresponding to the received message identifier and identifying a data item identifier stored in the second table in association with the received message identifier and to search the first table for a data item identifier corresponding to the data item identifier identified in the second table;

the computer further responsive to the received message to access a data item corresponding to the data item identifier found in the second table in association with the received message identifier only if the data item identifier found in the second table is also found in the first table.

19. The flight control computer system in accordance with claim 18 wherein a plurality of data item identifiers are stored in a selected sequence in the second table in association with a selected one of the message identifiers and wherein the computer is responsive to receipt of a datalink message including the selected one of the message identifiers to transmit a return datalink message including data items corresponding to data item identifiers defined in the second table by the message identifier received in the received message, and in the selected sequence.

* * * * *

UNITED STATES PATENT AND TRADEMARK OFFICE
CERTIFICATE OF CORRECTION

PATENT NO. : 5,457,800

DATED : October 10, 1995

INVENTOR(S) :
Peter J. Howells and Donald L. Moore

It is certified that error appears in the above-indentified patent and that said Letters Patent is hereby corrected as shown below:

Col. 8, claim 1, line 54:
        after "least" delete "," and insert --one data--.

Signed and Sealed this

Second Day of January, 1996

*Attest:*

BRUCE LEHMAN

*Attesting Officer*    *Commissioner of Patents and Trademarks*